(12) United States Patent
Asada et al.

(10) Patent No.: US 6,434,471 B1
(45) Date of Patent: Aug. 13, 2002

(54) VEHICLE SPACING CONTROL SYSTEM (75) Inventors: Tetsuya Asada, Kanagawa; Kenichi Egawa, Tokyo; Akira Higashimata; Satoshi Tange, both of Kanagawa, all of (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 09/598,468

(22) Filed: Jun. 22, 2000

(30) Foreign Application Priority Data

Jun. 23, 1999 (JP) ............................. 11-176896

(51) Int. Cl.$^7$ ............................ B60Q 1/00; G06F 15/00; G08G 1/09
(52) U.S. Cl. ............................. 701/96; 701/93; 701/300; 340/903
(58) Field of Search ............................ 701/96, 93, 300, 701/36, 301; 340/903, 436, 435, 438; 342/70, 71

(56) References Cited

U.S. PATENT DOCUMENTS

| 3,593,262 | A | * | 7/1971 | Spencer ..................... 340/36 |
| 3,618,003 | A | * | 11/1971 | Marshall ..................... 340/31 |
| 3,840,848 | A | * | 10/1974 | Marshall et al. ............ 340/38 P |
| 5,521,579 | A | * | 5/1996 | Bernhard ..................... 340/438 |
| 5,597,214 | A | * | 1/1997 | Katagiri et al. ............... 303/10 |
| 5,627,510 | A | * | 5/1997 | Yuan ........................... 340/435 |
| 5,936,518 | A | * | 8/1999 | Fukui et al. ................. 340/436 |
| 6,026,347 | A | * | 2/2000 | Schuster ..................... 701/301 |
| 6,085,151 | A | * | 7/2000 | Farmer et al. ............... 701/301 |
| 6,175,799 | B1 | * | 1/2001 | Tsutsumi et al. ............. 701/96 |
| 6,188,950 | B1 | * | 2/2001 | Tsutsumi et al. ............. 701/96 |
| 6,256,574 | B1 | * | 7/2001 | Prestl et al. ................. 701/96 |

FOREIGN PATENT DOCUMENTS

| DE | 4209047 C1 | 8/1993 |
| EP | 0827860 A2 | 3/1998 |
| FR | 2761174 | 9/1998 |
| JP | 11-42957 | 2/1999 |
| JP | 11-314537 | 11/1999 |

OTHER PUBLICATIONS

European Search Report dated Oct. 26, 2000.
U.S. patent application Ser. No. 09/598,462, Asada et al., filed Jun. 22, 2000.

* cited by examiner

Primary Examiner—Tan Nguyen
Assistant Examiner—Dalena Tran
(74) Attorney, Agent, or Firm—McDermott, Will & Emery

(57) ABSTRACT

When a vehicle-to-vehicle time gap is changed from a first level to a second level with a selector switch, a controller determines a desired time gap so that the desired time gap varies from the first level to the second level at such a gradual rate as to prevent an abrupt change in the vehicle speed. The controller further determines a desired vehicle spacing from the controlled vehicle to a preceding vehicle in accordance with the desired time gap and a sensed vehicle speed, and controls the driving force and braking force of the controlled vehicle so as to bring the actual vehicle spacing closer to the desired vehicle spacing.

18 Claims, 8 Drawing Sheets

VEHICLE SPACING CONTROL SYSTEM

BACKGROUND OF THE INVENTION

The present invention pertains to technique for controlling a headway vehicle spacing (or vehicle-to-vehicle distance) to a preceding vehicle to a desired vehicle spacing.

A Japanese Patent Kokai Publication H11(1999)-42957 published on Feb. 16, 1999, discloses a system for sensing a vehicle spacing to a preceding vehicle with a laser radar, and controlling the engine output and transmission ratio so as to reduce a deviation of a vehicle-to-vehicle time gap calculated from the sensed vehicle spacing and vehicle speed, from a desired time gap preset with a selector switch.

SUMMARY OF THE INVENTION

In this system, the desired time gap is changed with the selector switch, and a step change in the desired time gap can cause unwanted and uncomfortable acceleration or deceleration of the vehicle.

It is an object of the present invention to provide apparatus and/or method capable of changing vehicle-to-vehicle time gap or spacing smoothly.

According to the prevent invention, a vehicle spacing control apparatus comprises:

a vehicle spacing sensor sensing an actual vehicle spacing;

a vehicle speed sensor sensing an actual vehicle speed;

a selector changing a selected vehicle-to-vehicle time gap among a plurality of discrete values; and a controller determining a desired vehicle-to-vehicle time gap so that the selected time gap varies at a predetermined rate in response to a change in the selected time gap, determining a desired vehicle spacing in accordance with the desired time gap and the actual vehicle speed, and controlling at least one of a driving force and a braking force of a controlled vehicle so as to bring the actual vehicle spacing closer to the desired vehicle spacing.

According to another aspect of the present invention, a vehicle spacing control apparatus comprises: a vehicle interval sensor, such as a vehicle spacing sensor, for measuring a spatial or temporal interval from a controlled vehicle to a preceding vehicle ahead; a selector, such as a selector switch, changing a selected vehicle-to-vehicle interval among a plurality of discrete values; and a controller determining a desired vehicle-to-vehicle interval so that the desired vehicle-to-vehicle interval varies at a predetermined rate when the selected interval is changed, and controlling a longitudinal force of a controlled vehicle so as to bring the actual vehicle-to-vehicle interval closer to the desired vehicle-to-vehicle interval.

According to still another aspect of the present invention, a vehicle spacing control process comprises: ascertaining a sensed actual vehicle-to-vehicle interval from a controlled vehicle to a preceding vehicle; ascertaining a selected vehicle-to-vehicle interval selected among a plurality of discrete values; determining a desired vehicle-to-vehicle interval so that the desired vehicle-to-vehicle interval varies at a predetermined rate when the selected interval is changed; and controlling a longitudinal force of a controlled vehicle so as to bring the actual vehicle-to-vehicle interval closer to the desired vehicle-to-vehicle interval.

According to still another aspect of the present invention, a vehicle spacing control apparatus comprises: first means for ascertaining a sensed actual vehicle-to-vehicle interval from a controlled vehicle to a preceding vehicle; second means for ascertaining a change from a first select position to a second select position in a selector for determining a selected vehicle-to-vehicle interval ; third means for responding to the change from the first select position to the second select position in the selector by varying a desired vehicle-to-vehicle interval at a predetermined rate from a first select value corresponding to the first select position to a second select value corresponding to the second select position; and fourth means for controlling a longitudinal force of a controlled vehicle so as to bring the actual vehicle-to-vehicle interval closer to the desired vehicle-to-vehicle interval.

DETAILED DESCRIPTION OF THE INVENTION

Figure 1:
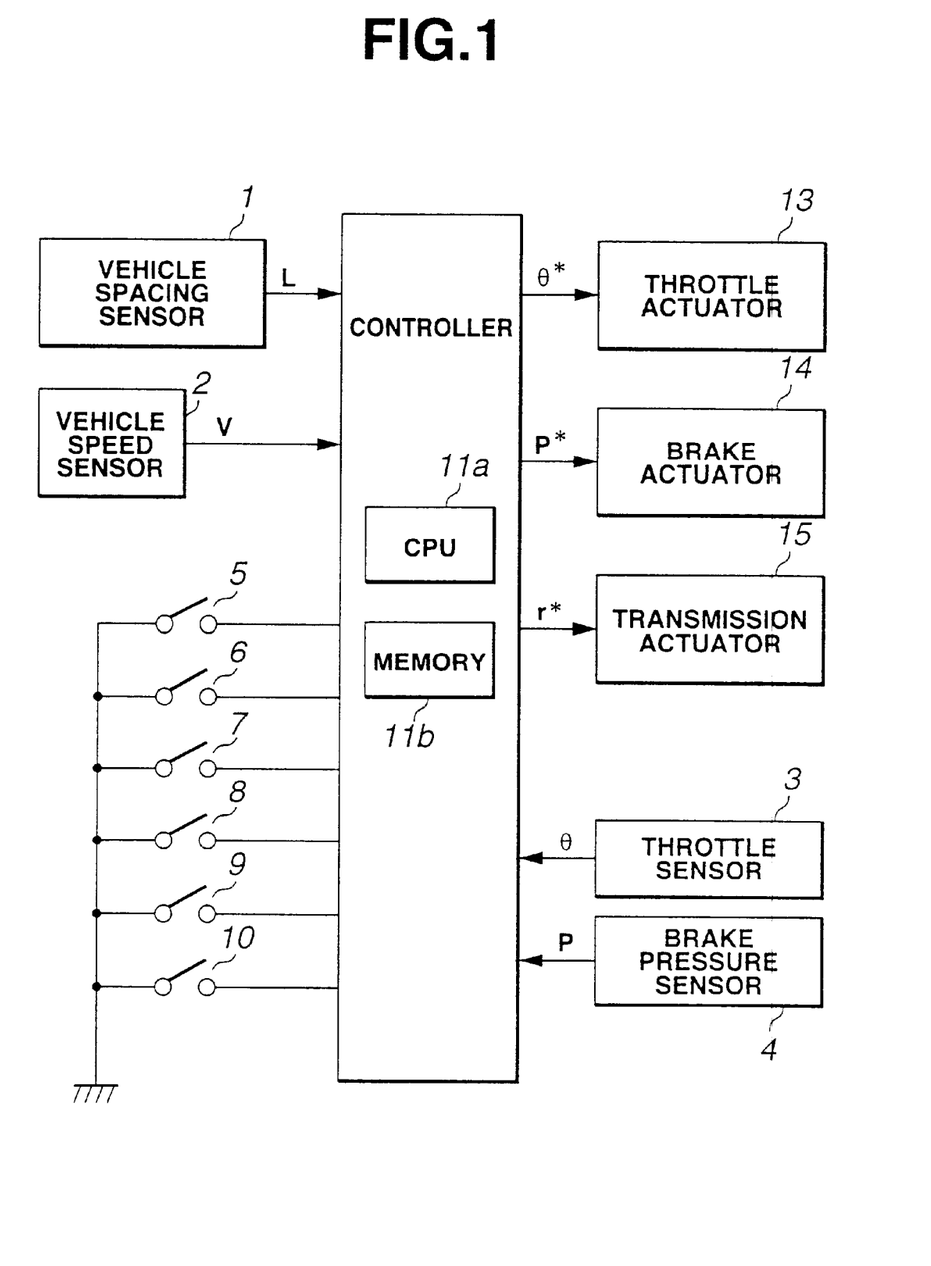
FIG. 1 is a schematic view showing a vehicle spacing control system according to a first embodiment of the present invention.

FIG. 1 shows a vehicle spacing control system according to a first embodiment of the present invention. A vehicle equipped with this control system is referred to as a controlled vehicle hereinafter.

A vehicle spacing sensor 1 is a device for sensing a vehicle spacing (or vehicle-to-vehicle distance or separation) L [m] between the controlled vehicle (or subject vehicle) and a preceding vehicle ahead. In this example, the vehicle spacing sensor 1 measures the vehicle spacing L by scanning a laser beam left and right ahead and receiving a beam reflected from a preceding vehicle ahead. Instead of the laser light, radio frequency waves and ultrasonic waves are adequate for use in the system for distance measurement.

A vehicle speed sensor 2 is arranged to sense the rotation of the output shaft of a transmission, and to produce a vehicle speed signal in the form of a pulse signal having a period corresponding to the rational speed of the output shaft. A vehicle speed (running speed or velocity) V of the controlled vehicle is determined by measuring the period or the number of pulses of the vehicle speed pulse signal.

A throttle sensor 3 senses a throttle opening θ which is an opening degree of a throttle valve for an engine of the controlled vehicle.

A brake pressure sensor 4 senses a brake fluid pressure P of a brake system of the controlled vehicle.

A vehicle interval select switch of this example is a time gap select switch 5. The time gap select switch 5 is a switch for varying a preset (selected) vehicle-to-vehicle time gap To stepwise. By each pressing operation, the selected time gap To is changed in a cyclic order of "FAR" (2.4 s)→"MEDIUM" (2.0 s)→"NEAR" (1.8 s)→"FAR" (2.4 s). As detailed later, a desired vehicle spacing L* is determined in accordance with the time gap To preset with the select switch 5 and the vehicle speed V. Accordingly, the values of the time gap To are denoted as "FAR", "MEDIUM" and "NEAR" to facilitate intuitive recognition in association with the desired vehicle spacing L*.

A main switch 6 is a switch for supplying power to a controller 11 and other components of the vehicle spacing control system, to set the system in a standby state ready for vehicle spacing control and vehicle speed control.

A set/coast switch 7 is a switch to start the vehicle spacing control and the vehicle speed control, and to set and increase a desired vehicle speed V*.

A resume/accelerate switch 8 is a switch to resume the spacing control and speed control and to decrease the desired vehicle speed V*.

A cancel switch 9 is a switch to cancel the spacing control and speed control.

A brake switch 10 is a switch for sensing depression of a brake pedal. When the brake pedal is depressed, the brake switch 10 produces a signal to cancel the spacing control and speed control like the cancel switch 9.

The controller 11 has therein a CPU 11a, a memory 11b and other peripherals, and performs the vehicle spacing control and the vehicle speed control by controlling a throttle actuator 13, a brake actuator 14 and a transmission actuator 15.

The throttle actuator 13 of this example has a vacuum pump, a vent valve and a safety valve, and regulates the throttle opening θ of the throttle valve by driving the pump motor and valve solenoid to control an engine torque or a driving force of the controlled vehicle.

The brake actuator 14 of this example has a negative pressure type booster, and controls the braking force of the controlled vehicle by regulating the brake fluid pressure P in a brake system of the controlled vehicle.

The transmission actuator 15 varies the speed ratio (or gear ratio) r of the transmission of the controlled vehicle. The transmission may be a step transmission having a predetermined number of speeds, or a continuously variable transmission.

Figure 2:
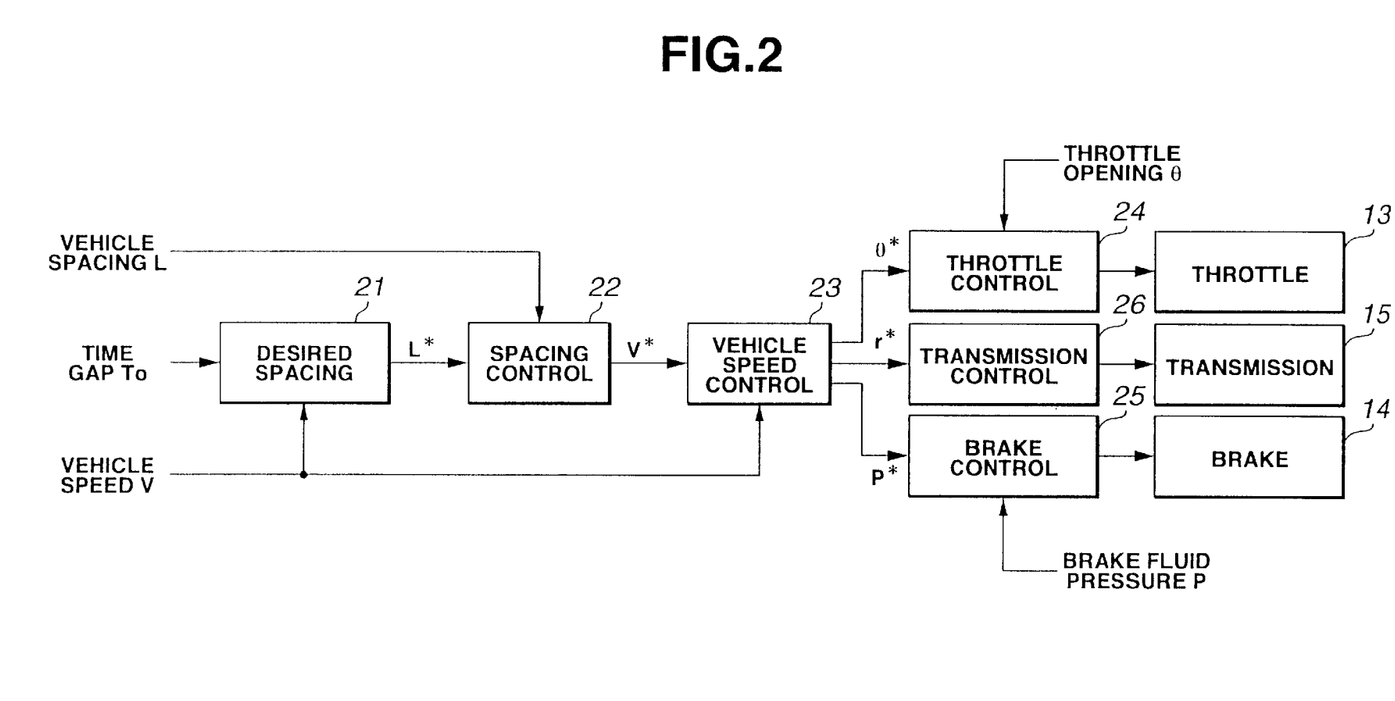
FIG. 2 is a block diagram showing sections in a controller in the control system of FIG. 1.

FIG. 2 is a control block diagram showing the vehicle spacing control and the vehicle speed control according to the first embodiment of the present invention.

The CPU 11a of the controller 11 forms, in the form of software, a desired vehicle spacing generating section 21, a vehicle spacing control section 22, a vehicle speed control section 23, a throttle control section 24, a brake control section 25 and a transmission control section 26.

The desired vehicle spacing generating section 21 receives the selected time gap To preset with the time gap select switch 5 and the actual vehicle speed V sensed by the vehicle speed sensor 2, and determines the desired vehicle spacing L* in accordance with To and V. In this example, the desired vehicle spacing L* is determined by L*=To×V. The time gap select switch 5 of this example is a three step control switch having only three discrete predetermined values {"FAR" (2.2 s), "MEDIUM" (1.8 s), "NEAR" (1.4 s)}. Therefore, the desired spacing L* converted from To in accordance with V is changed stepwise in stages, and changes like step changes in the desired spacing L* would cause unwanted acceleration or deceleration and deteriorate riding comfort when the time gap To is changed. To avoid this, the desired vehicle spacing generating section 21 in the control system according to this embodiment varies the desired vehicle spacing L* gently or gradually at a predetermined rate with respect to stepwise changes in the time gap To.

Figure 3:
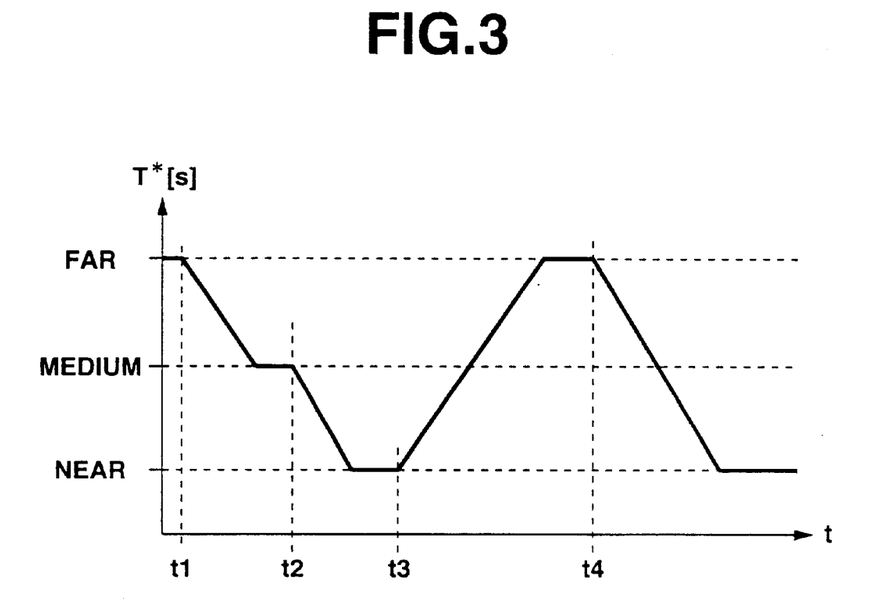
FIG. 3 is a graph for showing variation of a desired time gap T* responsive to changes in a selected time gap To in a first example according to the first embodiment.

FIG. 3 shows a desired time gap T* varied in response to stepwise changes in the selected time gap To, as an example.

In this example shown in FIG. 3, the preset time gap To is changed at an instate t1 from the FAR level to the MEDIUM level, at an instant t2 from the MEDIUM level to the NEAR level, at an instant t3 from the NEAR level to the FAR level, and at an instant t4 from the FAR level to the NEAR level. The desired time gap T* follows the thus-changed selected time gap To at a gentle rate. In this example, the time rate of change of the desired time gap T* is set equal to 0.6 sec/sec both in the increasing direction (to make longer the time gap To) and in the decreasing direction (to make shorter the time gap To).

The desired vehicle spacing generating section 21 determines the desired time gap T* varying gently with respect to the time gap To changing in the form of a step change, and convert the desired time gap T* varying with time, into the desired vehicle spacing L* corresponding to the vehicle speed V.

Figure 4:
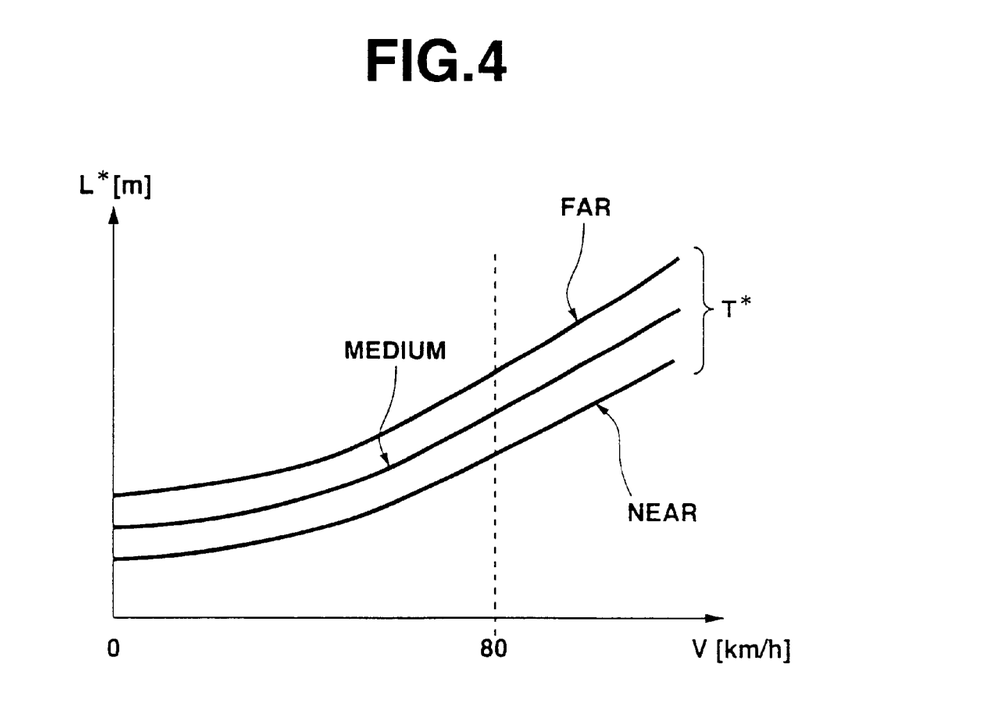
FIG. 4 is a graph showing a relationship of a desired vehicle spacing L* with respect to the desired time gap T* and a vehicle speed V, used in the control system of FIG. 1.

FIG. 4 shows the desired vehicle spacing L* with respect to the desired time gap T* and the vehicle speed V. In this embodiment, the desired vehicle spacing generating section 21 determines a value of the desired vehicle spacing L* corresponding to the desired time gap T* and the vehicle speed B, by table lookup from a preset desired vehicle spacing map as shown in FIG. 4. In the region where the vehicle speed V is equal to or higher than 80 km/h, the desired vehicle spacing L* is determined from the vehicle speed V and the desired time gap T* by the following equation.

$$L^* [m] = V [km/h] \cdot T^* [s] \cdot 1000/3600 \qquad [Eq. 1]$$

In the region where the vehicle speed V is lower than 80 km/h, the desired vehicle spacing map is so designed that the desired vehicle spacing L* is held at a predetermined level even when the vehicle speed V is equal to or close to zero.

The vehicle spacing control section 22 calculates a desired vehicle speed V* to bring the actual vehicle spacing L sensed by the spacing sensor 1, closer to the desired vehicle spacing L*.

The vehicle speed control section 23 calculates a desired throttle opening θ*, a desired brake fluid pressure P* and a desired speed ratio r* to bring the actual vehicle speed V sensed by the vehicle speed sensor 2, closer to the desired vehicle speed V*.

The throttle control section 24 controls the throttle actuator 13 to bring the actual throttle opening θ sensed by the throttle sensor 3, closer to the desired throttle opening θ*.

The brake control section 25 controls the brake actuator 14 to bring the actual brake pressure P sensed by the brake pressure sensor 4, closer to the desired brake pressure P*.

The transmission control section 26 controls the transmission actuator 15 to set the actual speed ratio (or gear ratio) r of the transmission, equal to the desired speed ratio r*.

In this way, when the time gap To is changed like a step change, this control system determines a value of the desired time gap T* so as to follow at the predetermined speed, further determines a value of the desired vehicle spacing L* corresponding to the value of the desired time gap T* and a current value of the sensed actual vehicle speed V, and controls the driving force and braking force of the controlled vehicle so as to bring the sensed actual vehicle spacing L closer to the desired vehicle spacing L*. Therefore, this control system can prevent an abrupt change in the vehicle speed from being caused by a switching operation of the time gap To, and improve the ride.

Figure 5:
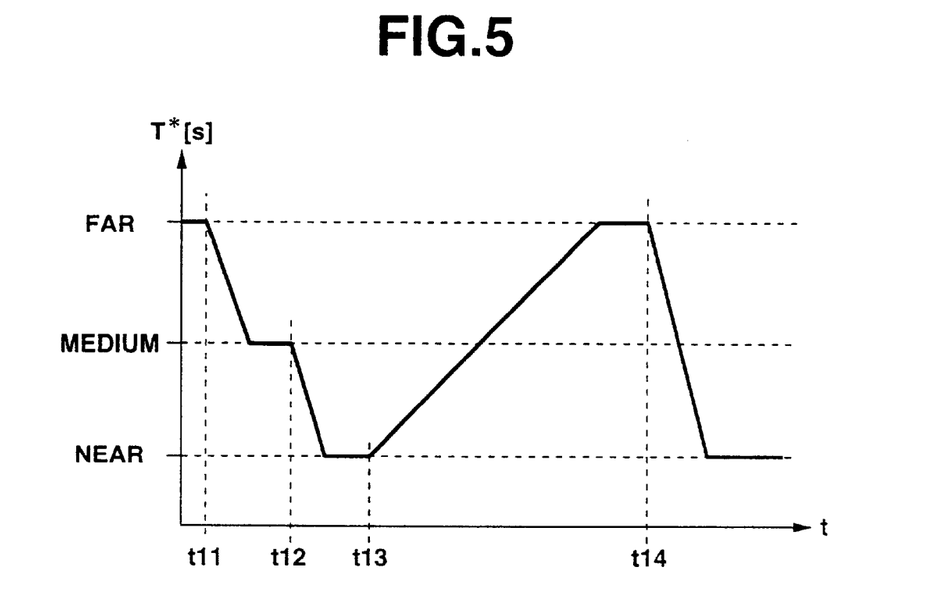
FIG. 5 is a graph for showing the desired time gap T* varying in response to changes in the selected time gap To in a second example according to the first embodiment.

FIG. 5 shows a variation of the first embodiment. In the preceding example shown in FIG. 3, the time rate of change of the desired time gap T* is set equal to a single common value of 0.6 s/s both in the increasing direction and the decreasing direction. In the example of FIG. 5, the time rate of change of the desired time gap T* is set equal to a first value in the decreasing direction (in the case of decreasing the time gap To), and set equal to a second value smaller than the first value, in the increasing direction (in the case of increasing the time gap To).

FIG. 5 shows the desired time gap T* varying in response to changes in the selected time gap To.

In this example, the selected time gap To is changed at an instate t11 from FAR to MEDIUM, at an instant t12 from MEDIUM to NEAR, at an instant t13 from NEAR to FAR, and at an instant t14 from FAR to NEAR. The desired time gap T* follows the thus-changed selected time gap To at a gentle rate. In the example of FIG. 5, the time rate of change of the desired time gap T* is set equal to a greater value in the decreasing direction (when the time gap To and hence the vehicle spacing are to be decreased) so as to cause the controlled vehicle to rapidly approach a preceding vehicle, and to a smaller value in the increasing direction (when the time gap To and hence the vehicle spacing are to be increased) so as to increase the vehicle spacing gradually.

When the vehicle spacing is decreased by decreasing the time gap, the use of the greater value for the time rate of change of the desired time gap T* causes the acceleration to become greater in the case of a switching operation to change To. However, the vehicle speed control section 23 limits the acceleration to a predetermined maximum acceleration αmax which, in this example, is equal to 0.06 G. Thus, the acceleration is held equal to or lower than 0.06 G. In this case, the control operation to decrease the time gap and the vehicle spacing with a greater acceleration increased to a non-excessive extent is agreeable and conformable to driver's intention and expectation.

When, on the other hand, the vehicle spacing to a preceding vehicle is increased by increasing the time gap, an increase in the time rate of change of the desired time gap T* would provide unnatural feeling to passengers with a larger deceleration. Therefore, this control system acts to decelerate the vehicle gradually and increase the vehicle spacing gradually.

Figure 6:
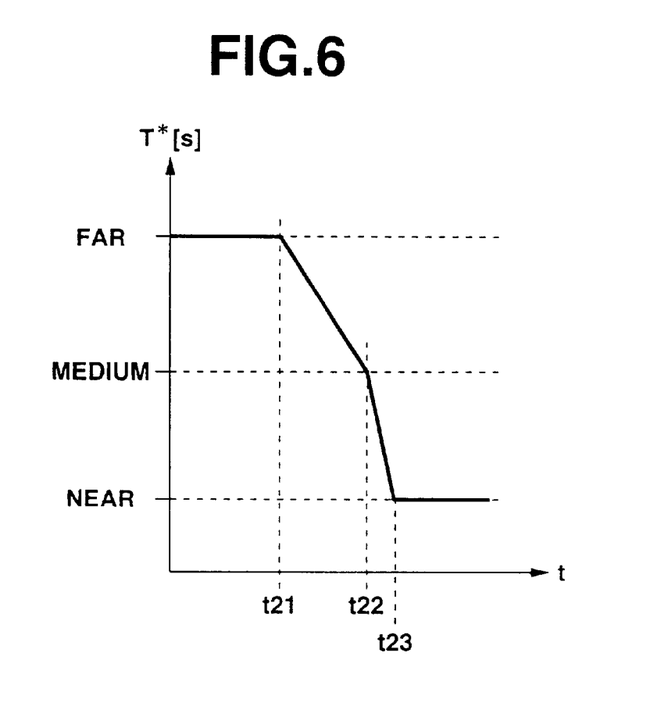
FIG. 6 is a graph for showing the desired time gap T* varying in response to changes in the selected time gap To in a third example according to the first embodiment.

FIG. 6 shows another variation of the first embodiment. In the case of a change of the time gap To from FAR to NEAR in a single step, the time rate of change of the desired time gap T* may be further increased in the middle of a transition.

FIG. 6 shows the desired time gap T* varying in response to a change in the selected time gap To.

In the example of FIG. 6, the time gap To is switched at once from FAR to NEAR at an instant t21. In the transition from FAR to NEAR, the time rate of change of the desired time gap T* is set equal to a first value during a first period from FAR to MEDIUM (t21~t22), and set equal to a second value greater than the first value during a second period from MEDIUM to NEAR (t22~t23).

The change in the slope of the desired time gap T* at the halfway point t22 acts to increase. the acceleration. However, the vehicle speed control section 23 limits the acceleration to the maximum level of 0.06 G. Thus, the control system in the example of FIG. 6 can meet driver's expectation of reducing the vehicle spacing promptly, and at the same time prevent unwanted acceleration which would be caused if the rate of change of T* were changed to a greater value at the instant t21 immediately when To is changed from FAR to NEAR.

Figure 7:
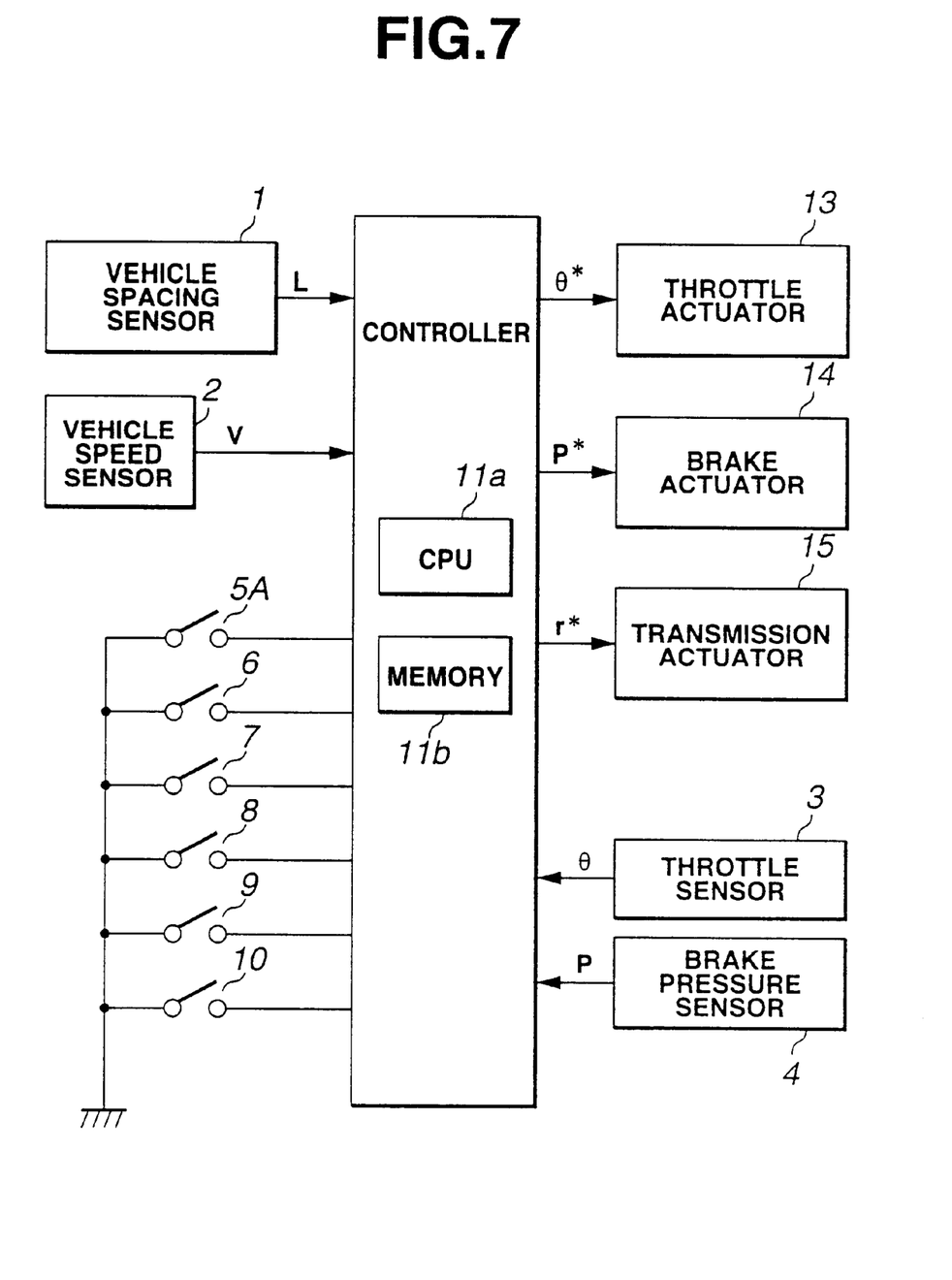
FIG. 7 is a schematic view showing a vehicle spacing control system according to a second embodiment of the present invention.

FIG. 7 shows a vehicle spacing control system according to a second embodiment of the present invention. In the first embodiment, the select switch 5 is arranged to select a level of the time interval or time gap To. In the second embodiment, the interval selected is a spatial interval or vehicle spacing. The control system of FIG. 7 is almost the same as the system of FIG. 1. The different points are as follows:

A vehicle spacing select switch 5A is a switch for changing a selected vehicle spacing (or vehicle-to-vehicle distance) stepwise. By each pressing operation, the vehicle spacing is changed in a cyclic order of "FAR"→"MEDIUM"→"NEAR"→"FAR".

Figure 8:
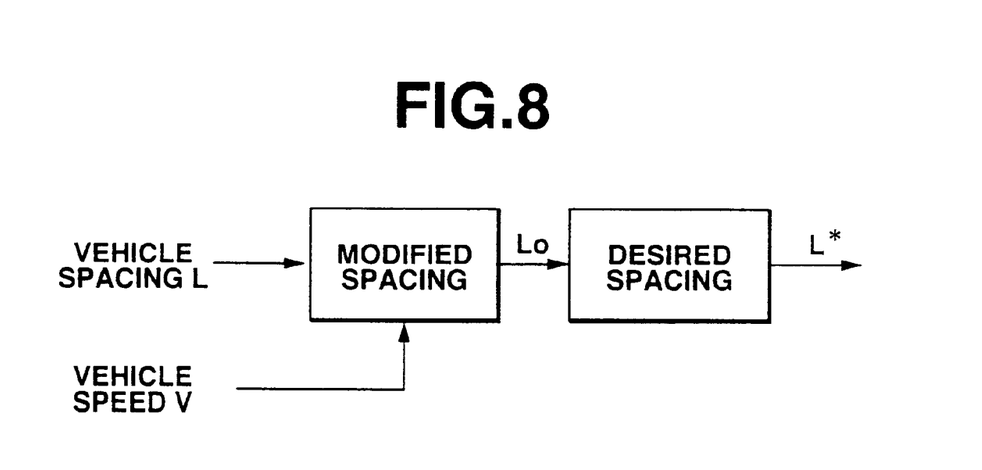
FIG. 8 is a block diagram showing sections in a controller in the control system of FIG. 7.

FIG. 8 shows part of the vehicle spacing control and vehicle speed control in the form of a block diagram. FIG. 8 shows only the different points from the block diagram of FIG. 2.

The CPU 11a of the controller 11 forms, in the form of software, a vehicle spacing modifying section 31, a desired vehicle spacing generating section 21A, a vehicle spacing control section 22, a vehicle speed control section 23, a throttle control section 24, a brake control section 25 and a transmission control section 26.

The vehicle spacing modifying section 31 determines a modified vehicle spacing Lo by modifying the vehicle spacing L selected by the vehicle spacing select switch 5A, with the actual vehicle speed V sensed by the vehicle speed sensor 2. The levels of the vehicle spacing corresponding to FAR, MEDIUM and NEAR are determined on the basis of a predetermined reference vehicle speed which, in this example, is 120 km/h.

It is optional to omit the modification with the vehicle speed V. In this case, the vehicle spacing modifying section 31 is not needed.

Figure 9:
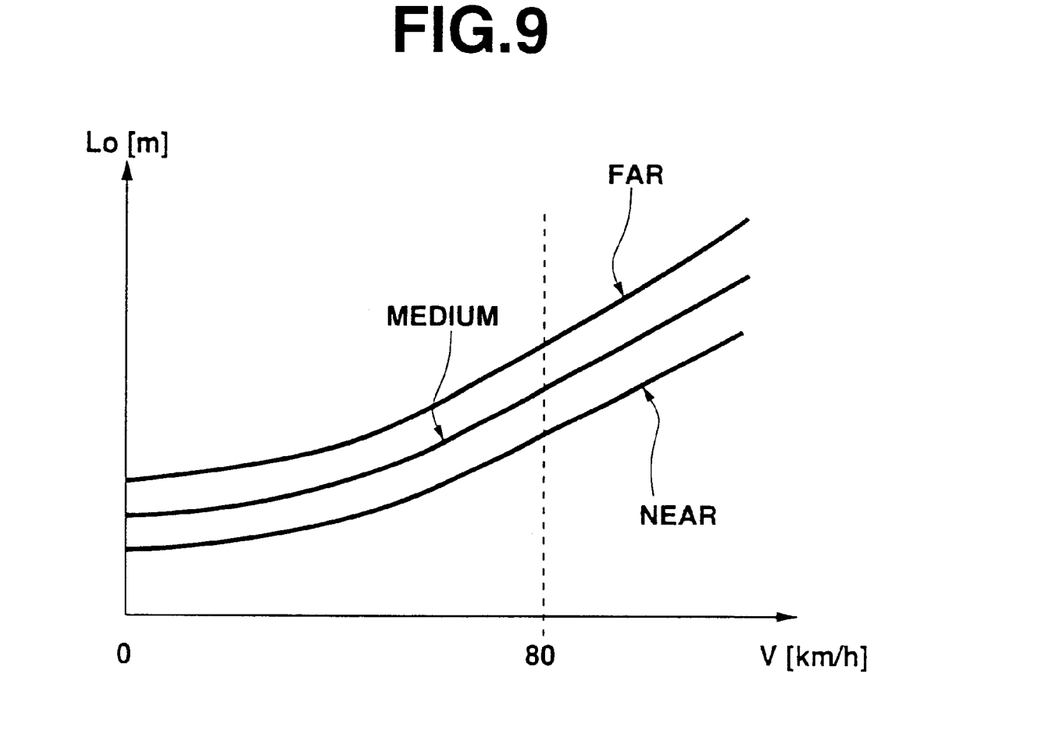
FIG. 9 is a graph showing a relationship for determining a vehicle spacing Lo in accordance with a select position of a selector switch and the vehicle speed V, used in the control system of FIG. 7.

FIG. 9 shows the vehicle spacing Lo modified with the vehicle speed V, for each of FAR, MEDIUM and NEAR.

In this example, the modified vehicle spacing Lo is determined in accordance with the selected level of FAR, MEDIUM and NEAR of the vehicle spacing and the vehicle speed V, by table look-up from a preset vehicle spacing modifying map as shown in FIG. 9. This map is determined by using a vehicle spacing at a vehicle speed of 80 km/h as a reference. At 80 km/h (V=80 km/h), the time gap is 2.2 s and the vehicle spacing Lo is equal to 50 m in the case of FAR. In MEDIUM, the time gap is set equal to 1.8 s, and Lo=40 m. In NEAR, the time gap is 1.4 s, and Lo=30 m. As shown in FIG. 9, the vehicle spacing Lo is sufficiently greater than zero so as to ensure a sufficient vehicle spacing even in the vicinity of the point where the vehicle speed V is equal to zero (V=0). In the example of FIG. 9 (like the characteristic in the example of FIG. 4), the vehicle spacing Lo is decreased monotonically and smoothly with decrease in the vehicle speed V. The rate of decrease of the vehicle spacing Lo with respect to V is lowered in a low vehicle speed region.

The desired vehicle spacing generating section 21A determines the desired vehicle spacing L* from the modified vehicle spacing Lo by varying the modified vehicle spacing at a predetermined rate. Thus, the desired vehicle spacing L* follows the modified vehicle spacing Lo at a predetermined rate. The vehicle spacing select switch 5A of this example has only three select positions or states for FAR, MEDIUM and NEAR. Therefore, the modified vehicle spacing Lo is changed in the form of a step change, which would cause undesirable steep increase or decrease in the vehicle speed. In the control system of this example, therefore, the desired vehicle spacing generating section 21A determines the desired vehicle spacing L* varying at a gentle rate in response to the vehicle spacing Lo changing in stages.

Figure 10:
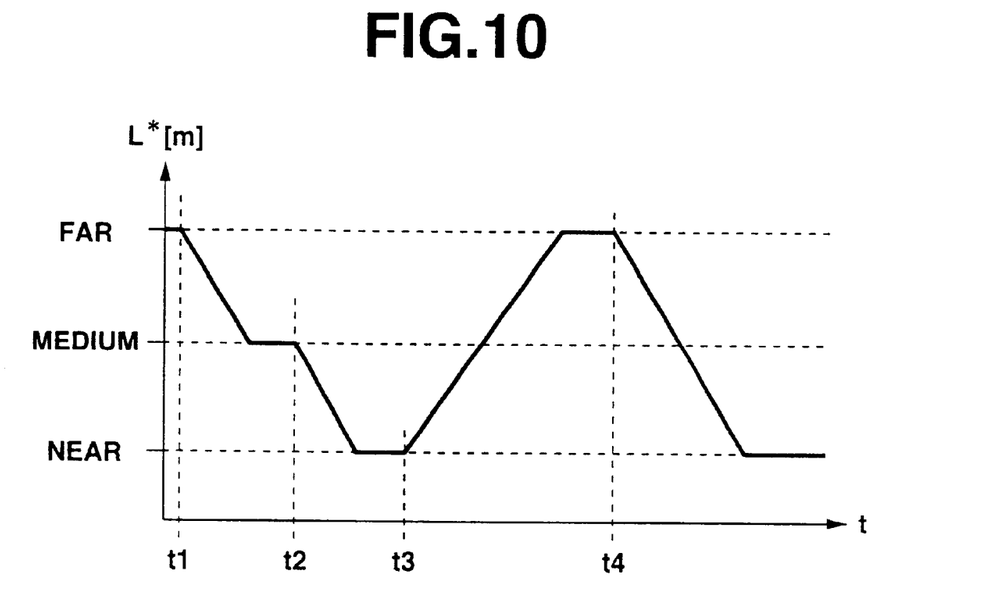
FIG. 10 is a graph for showing variation of a desired vehicle spacing L* responsive to changes in the select position of a vehicle spacing select switch in a first example according to the second embodiment.

FIG. 10 shows the desired vehicle spacing L* varying in response to step changes in the modified vehicle spacing Lo.

In this example shown in FIG. 10, the vehicle spacing is changed at an instate t1 from FAR to MEDIUM, at an instant t2 from MEDIUM to NEAR, at an instant t3 from NEAR to FAR, and at an instant t4 from FAR to NEAR. The desired vehicle spacing L* follows the thus-changed spacing L at a gentle rate. In this example, the rate of change of the desired vehicle spacing L* is set equal to a single common value both in the increasing direction (to make longer the vehicle spacing) and in the decreasing direction (to make shorter the vehicle spacing).

The desired vehicle spacing L* is supplied from the desired spacing generating section 21A to the vehicle spacing control section 22 as shown in FIG. 2. The vehicle speed control section 23, the throttle control section 24, the brake control section 25 and the transmission control section 26 function in the same manner as in the system of FIG. 2.

In this way, when the vehicle spacing is changed like a step change, this control system determines a value of the desired vehicle spacing* so as to follow at the predetermined speed, and controls the driving force and braking force of the controlled vehicle so as to bring the sensed actual vehicle spacing L closer to the desired vehicle spacing L*. Therefore, this control system can prevent an abrupt change in the vehicle speed from being caused by a switching operation of the vehicle spacing, and improve the ride.

Figure 11:
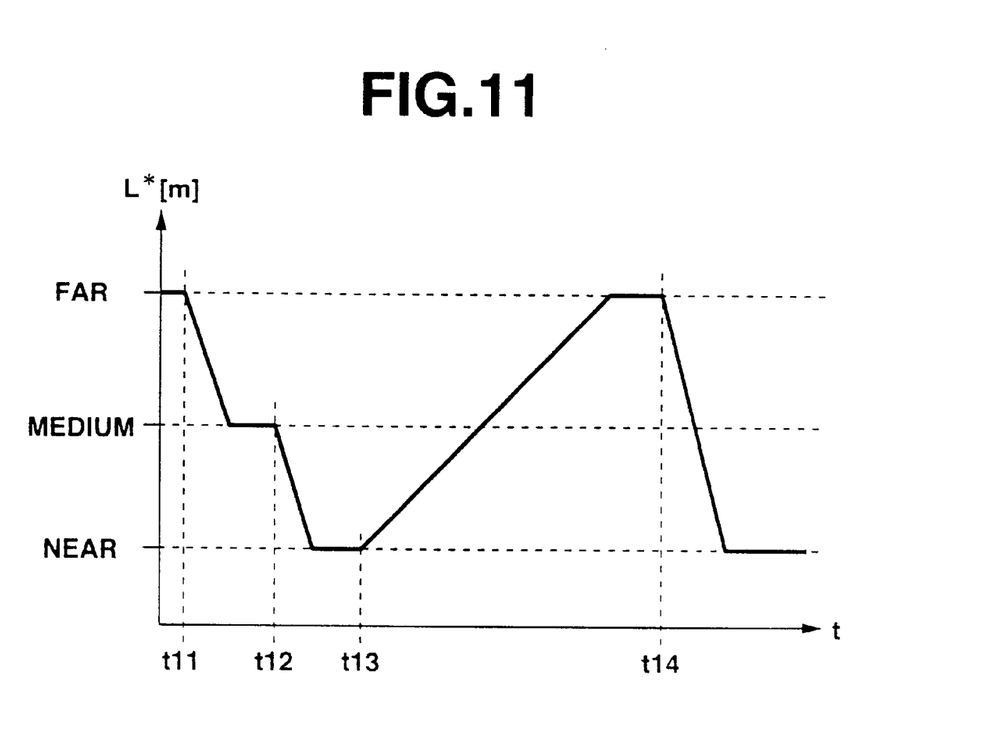
FIG. 11 is a graph for showing the desired vehicle spacing L* varying in response to changes in the select position of the vehicle spacing select switch in a second example according to the second embodiment.

FIG. 11 shows a variation of the second embodiment. In the preceding example shown in FIG. 10, the time rate of change of the desired vehicle spacing L* is set equal to a single common value both in the increasing direction and the decreasing direction. In the example of FIG. 11, the time rate of change of the desired vehicle spacing L* is set equal to a greater value in the decreasing direction (in the case of decreasing the vehicle spacing), and set equal to a smaller value smaller than the greater value, in the increasing direction (in the case of increasing the vehicle spacing).

FIG. 11 shows the desired vehicle spacing L* varying in response to changes in the vehicle spacing.

In this example, the vehicle spacing is changed at an instate t11 from FAR to MEDIUM, at an instant t12 from MEDIUM to NEAR, at an instant t13 from NEAR to FAR, and at an instant t14 from FAR to NEAR. The desired vehicle spacing L* follows the thus-changed vehicle spacing at relatively gradual rates. In the example of FIG. 11, the time rate of change of the desired vehicle spacing L* is increased in the case of the decreasing direction (when the vehicle spacing is to be decreased) so as to cause the controlled vehicle to rapidly approach. a preceding vehicle, and decreased in the case of the increasing direction (when the vehicle spacing is to be increased) so as to increase the vehicle spacing gradually.

When the vehicle spacing is decreased, the use of the greater value for the time rate of change of the desired vehicle spacing L* causes the acceleration to become greater in the case of a switching operation. However, the vehicle speed control section 23 limits the acceleration to a predetermined maximum acceleration αmax of 0.06 G. In this case, the control operation to decrease the vehicle spacing with a greater acceleration is agreeable and conformable to driver's intention and expectation.

When, on the other hand, the vehicle spacing to a preceding vehicle is increased, an increase in the time rate of change of the vehicle spacing L* would provide unnatural feeling to passengers with a greater deceleration. Therefore, this control system acts to decelerate the vehicle gradually and increase the vehicle spacing gradually.

Figure 12:
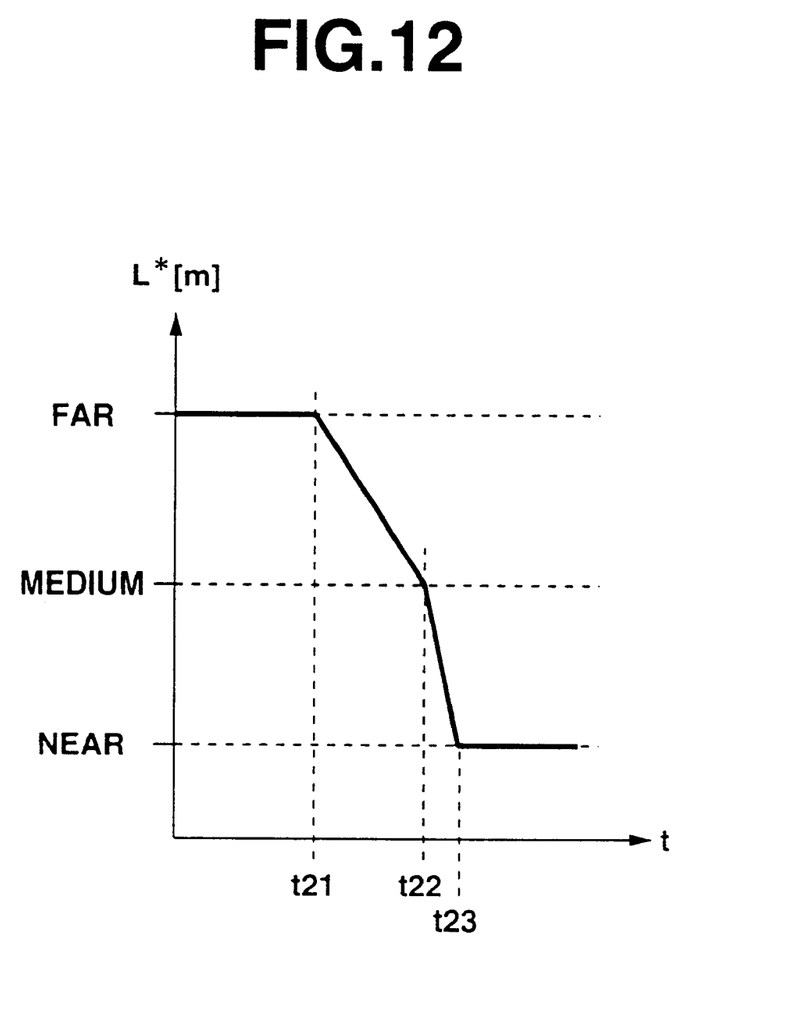
FIG. 12 is a graph for showing the desired vehicle spacing L* varying in response to changes in the select position of the vehicle spacing select switch in a third example according to the second embodiment.

FIG. 12 shows another variation of the second embodiment. In the case of a change of the vehicle spacing from FAR to NEAR in a single step, the time rate of change of the desired vehicle spacing L* may be further increased in the middle of a transition.

FIG. 12 shows the desired vehicle spacing L* varying in response to a change from FAR to NEAR.

In the example of FIG. 12, the vehicle spacing is switched at once from FAR to NEAR at an instant t21. In the transition from FAR to NEAR, the time rate of change of the vehicle spacing L* is set equal to a first value during a first period from FAR to MEDIUM (t21~t22), and set equal to a second value greater than the first value during a second period from MEDIUM to NEAR (t22~t23).

The change in the slope of the desired vehicle spacing L* at the halfway point t22 acts to increase the acceleration. However, the vehicle speed control section 23 limits the acceleration to the maximum level of 0.06 G. Thus, the control system in the example of FIG. 12 can meet driver's expectation of reducing the vehicle spacing promptly, and at the same time prevent unwanted acceleration which would be caused if the rate of change of L* were changed to a greater value at the instant t21 immediately after the switching operation from FAR to NEAR.

The select switch 5 or 5A may be a collection of three distinct switches for FAR, MEDIUM and NEAR. The number of select positions or select states of the select switch 5 or 5A is three (FAR, MEDIUM and NEAR) in the preceding example. However, the number of select positions is not limited to three. The number of select positions may be 2 or equal to or greater than 4. The above-mentioned numerical values for the time gap of the time gap select switch 5 and the time spacing of the vehicle spacing select switch 5A are not restrictive. The present invention is not limited to these numerical values.

It is possible to omit the control of the braking force with the brake actuator 14. In this case, the control system may be arranged to produce the braking force only with engine braking without resorting to the brake system, or may be arranged to produce engine braking by changing the speed ratio r with the transmission actuator 15.

This application is based on a prior Japanese Patent Application No. H11(1999)-176896. The entire contents of this Japanese Patent application No. H11(1999)-176896 with a filing date of Jun. 23, 1999 in Japan are hereby incorporated by reference.

Although the invention has been described above by reference to certain embodiments of the invention, the invention is not limited to the embodiments described above. Modifications of the embodiments described above will occur to those skilled in the art in light of the above teachings. The scope of the invention is defined with reference to the following claims.

What is claimed is:

1. A vehicle spacing control apparatus comprising:
   a vehicle spacing sensor sensing an actual vehicle spacing;
   a vehicle speed sensor sensing an actual vehicle speed;
   a selector changing a selected vehicle-to-vehicle time gap among a plurality of discrete values; and
   a controller
      determining a desired vehicle-to-vehicle time gap so that the desired time gap varies at a predetermined rate in response to a change in the selected time gap, the predetermined rate being a predetermined amount of change per unit time,
      determining a desired vehicle spacing in accordance with the desired time gap and the actual vehicle speed, and
      controlling at least one of a driving force and a braking force of a controlled vehicle so as to bring the actual vehicle spacing closer to the desired vehicle spacing.

2. The vehicle spacing control apparatus as claimed in claim 1, wherein the controller determines the desired time gap so that a time rate of change of the desired time gap is higher when the desired time gap is to be decreased than when the desired time gap is to be increased.

3. The vehicle spacing control apparatus as claimed in claim 1, wherein, when the desired time gap is decreased from a higher value to a lower value, the controller changes a time rate of change of the desired time gap midway during a transition of the desired time gap from the higher value to the lower value.

4. The vehicle spacing control apparatus as claimed in claim 1, wherein the controller has a predetermined map for determining the desired vehicle spacing from the time gap and the vehicle speed, and determines a value of the desired vehicle spacing corresponding to values of the desired time gap and the actual vehicle speed by look up from the map.

5. The vehicle spacing control apparatus as claimed in claim 1, wherein the vehicle spacing control apparatus is mounted on the controlled vehicle, and the selector is a device to be operated by a driver of the controlled vehicle to increase or decrease the desired vehicle spacing.

6. The vehicle spacing control apparatus as claimed in claim 5, wherein the vehicle spacing control apparatus further comprises an actuator for decelerating the controlled vehicle and an actuator for accelerating the controlled vehicle; and
   the controller controls the actuators so as to bring the actual vehicle spacing closer to the desired vehicle spacing.

7. A vehicle spacing control apparatus comprising:
   a vehicle interval sensor sensing an actual vehicle-to-vehicle interval from a controlled vehicle to a preceding vehicle;
   a selector changing a selected vehicle-to-vehicle interval among a plurality of discrete values; and
   a controller
      determining a desired vehicle-to-vehicle interval so that the desired vehicle-to-vehicle interval varies at a predetermined rate when the selected interval is changed, the predetermined rate being a predetermined amount of change per unit time, and
      controlling a longitudinal force of a controlled vehicle so as to bring the actual vehicle-to-vehicle interval closer to the desired vehicle-to-vehicle interval.

8. The vehicle spacing control apparatus as claimed in claim 7, wherein, the controller determines a modified vehicle-to-vehicle interval so that, when the selected vehicle-to-vehicle interval is changed from a first interval value to a second interval value, the modified interval varies at a predetermined time rate of change from the first interval value to the second interval value, and the controller further determines the desired vehicle-to-vehicle interval from the modified interval.

9. The vehicle spacing control apparatus as claimed in claim 8, wherein the time rate of change of the modified interval is set equal to a predetermined constant rate value both when the selected interval is decreased, and when the selected interval is increased.

10. The vehicle spacing control apparatus as claimed in claim 8, wherein the time rate of change of the modified interval is set equal to a higher rate value when the selected interval is decreased, and set equal to a lower rate value smaller than the higher rate value when the selected interval is increased.

11. The vehicle spacing control apparatus as claimed in claim 8, wherein, when the selected interval is changed from a greater interval value to a smaller interval value smaller than the greater interval value, the time rate of change of the modified interval is set equal to a smaller rate value during a first period from a first instant at which the selected interval is changed from the greater interval value to the smaller interval value, to a second instant, and set equal to a greater rate value greater than the smaller rate value during a second period from the second instant to a third instant at which the modified interval becomes equal to the smaller interval value.

12. The vehicle spacing control apparatus as claimed in claim 7, wherein the actual interval is a spacing between the controlled vehicle to a preceding vehicle, the selected interval is a selected spacing, and the desired interval is a desired spacing from the controlled vehicle to a preceding vehicle.

13. The vehicle spacing control apparatus as claimed in claim 10, wherein the control apparatus further comprises a vehicle speed sensor sensing an actual vehicle speed, and the controller determines a modified interval by modifying the selected interval with the actual vehicle speed, and further determines the desired interval so that the desired interval follows a change in the modified interval at the predetermined rate.

14. The vehicle spacing control apparatus as claimed in claim 13, wherein the controller has a predetermined map for determining the modified interval from the selected interval and the actual vehicle speed, and determines a value of the modified interval corresponding to values of the selected interval and the actual vehicle speed by look up from the map.

15. The vehicle spacing control apparatus as claimed in claim 7, wherein the actual interval is a spatial interval between the controlled vehicle to a preceding vehicle, the selected interval is a selected time interval between the controlled vehicle and the preceding vehicle, and the desired interval is a desired spatial interval from the controlled vehicle to a preceding vehicle.

16. The vehicle spacing control apparatus as claimed in claim 7, wherein the vehicle spacing control apparatus is mounted on the controlled vehicle, and the selector is a device to be operated by a driver of the controlled vehicle to increase or decrease the desired vehicle spacing.

17. A vehicle spacing control process comprising:
- ascertaining a sensed actual vehicle-to-vehicle interval from a controlled vehicle to a preceding vehicle;
- ascertaining a selected vehicle-to-vehicle interval selected among a plurality of discrete values;
- determining a desired vehicle-to-vehicle interval so that the desired vehicle-to-vehicle interval varies at a predetermined rate when the selected interval is changed, the predetermined rate being a predetermined amount of change per unit time; and
- controlling a longitudinal force of a controlled vehicle so as to bring the actual vehicle-to-vehicle interval closer to the desired vehicle-to-vehicle interval.

18. A vehicle spacing control apparatus comprising:
- means for ascertaining a sense actual vehicle-to-vehicle interval from a controlled vehicle to a preceding vehicle;
- means for ascertaining a change from a first select position to a second select position in a selector for determining a selected vehicle-to-vehicle interval;
- means for responding to the change from the first select position to the second select position in the selector by varying a desired vehicle-to-vehicle interval at a predetermine rate from a first select value corresponding to the first select position to a second select value corresponding to the second select position, the predetermined rate being a predetermined amount of change per unit time; and
- means for controlling a longitudinal force of a controlled vehicle so as to bring the actual vehicle-to-vehicle interval closer to the desired vehicle-to-vehicle interval.

* * * * *